United States Patent [19]
De Corso et al.

[11] 3,826,080
[45] July 30, 1974

[54] SYSTEM FOR REDUCING NITROGEN-OXYGEN COMPOUND IN THE EXHAUST OF A GAS TURBINE

[75] Inventors: Serafino M. De Corso, Media; Charles E. Hussey, Jr., Glenolden, both of Pa.; Michael J. Ambrose, Woodbury, N.J.

[73] Assignee: Westinghouse Electric Corporation, Pittsburgh, Pa.

[22] Filed: Mar. 15, 1973

[21] Appl. No.: 341,643

[52] U.S. Cl.......... 60/39.55, 60/39.26, 60/39.74 R, 60/39.49, 60/DIG. 11, 431/4
[51] Int. Cl............................ F02c 7/16, F02c 9/14
[58] Field of Search......... 60/39.55, 39.58, 39.74 B, 60/39.74 R, 39.49, DIG. 11, 39.26, 39.3; 431/4

[56] References Cited
UNITED STATES PATENTS

| | | | |
|---|---|---|---|
| 324,828 | 8/1885 | Gassett | 60/39.49 |
| 2,168,313 | 8/1939 | Bichassky | 60/39.55 |
| 2,441,751 | 5/1948 | Broggi | 60/39.26 |
| 3,021,673 | 2/1962 | Mock | 60/39.26 |
| 3,224,195 | 12/1965 | Walsh | 60/39.74 R |
| 3,426,527 | 2/1969 | O'Connor | 60/39.74 B |
| 3,693,347 | 9/1972 | Kydd et al. | 60/39.55 |
| 3,746,498 | 7/1973 | Stengel | 431/4 |

FOREIGN PATENTS OR APPLICATIONS

| | | | |
|---|---|---|---|
| 523,847 | 4/1956 | Canada | 60/39.55 |

*Primary Examiner*—Carlton R. Croyle
*Assistant Examiner*—Warren Olsen
*Attorney, Agent, or Firm*—F. J. Baehr, Jr.

[57] ABSTRACT

To reduce nitrogen-oxygen compounds in the exhaust of a gas turbine water is supplied to a fuel injection nozzle via the atomizing air passages disposed therein providing a coolant fluid directly to the primary combustion zone.

8 Claims, 2 Drawing Figures

SYSTEM FOR REDUCING NITROGEN-OXYGEN COMPOUND IN THE EXHAUST OF A GAS TURBINE

BACKGROUND OF THE INVENTION

This invention relates to gas turbines and more particularly to a system for reducing the nitrogen-oxygen compound, $NO_x$, in the exhaust of a gas turbine.

Conventional power generating plants contribute to air pollution and with the doubling of electrical power comsumed every decade, the problem becomes icreasingly critical. While gas turbines are potentially less polluting than fossil-fired steam power generating plants, they produce enough pollutants to come under government scrutiny and control, so that county, state and federal statutes regulate the emission of pollutants from power generating gas turbines in various locations.

Pollutant emission associated with power producing gas turbines include carbon monoxide, carbon dioxide, water vapor, smoke or unburned carbon or hydrocarbons, nitrogen-oxygen compounds and sulpher-oxygen compounds. Of these, carbon dioxide and water vapor are considered unobjectionable. Because of the high air to fuel ratio associated with gas turbines, carbon monoxide is not a problem. Smoke, which may comprise unburned carbon or hydrocarbons, can be eliminated by controlling the design at the combustion chamber of the gas turbine. Sulphur dioxide can be limited by selecting the proper fuel having a low sulphur content. Since nitrogen and oxygen are the main constituents of the air utilized for combustion, these elements cannot be eliminated or controlled. However, the combination of atmospheric nitrogen and oxygen to form nitrogen-oxygen compounds, $NO_x$, can be reduced by tempering the flame temperature in the combustion chamber and by reducing the time that the products of combustion remain at elevated temperature.

SUMMARY OF THE INVENTION

In general, a gas turbine, when made in accordance with this invention, comprises a combustion chamber, a fuel injection nozzle disposed adjacent one end of the combustion chamber and having an atomizing air passageway and a plurality of orifices which are utilized during ignition and low fuel flows to atomize the influent fuel entering the combustion chamber, a valve for shutting off the atomizing air to the passageway and orifices and a system for supplying a pressurized coolant fluid o the passageway and orifices, whereby the coolant fluid admixes with the burning fuel thereby reducing the quantity of nitrogen-oxygen compounds produced in the combustion chamber.

BRIEF DESCRIPTION OF THE DRAWINGS

The objects and advantages of this invention will become more apparent from reading the following detailed description in connection with the accompanying drawings in which corresponding reference characters indicate corresponding portions throughout the drawings and in which.

DESCRIPTION OF THE PREFERRED EMBODIMENT

Figure 1:
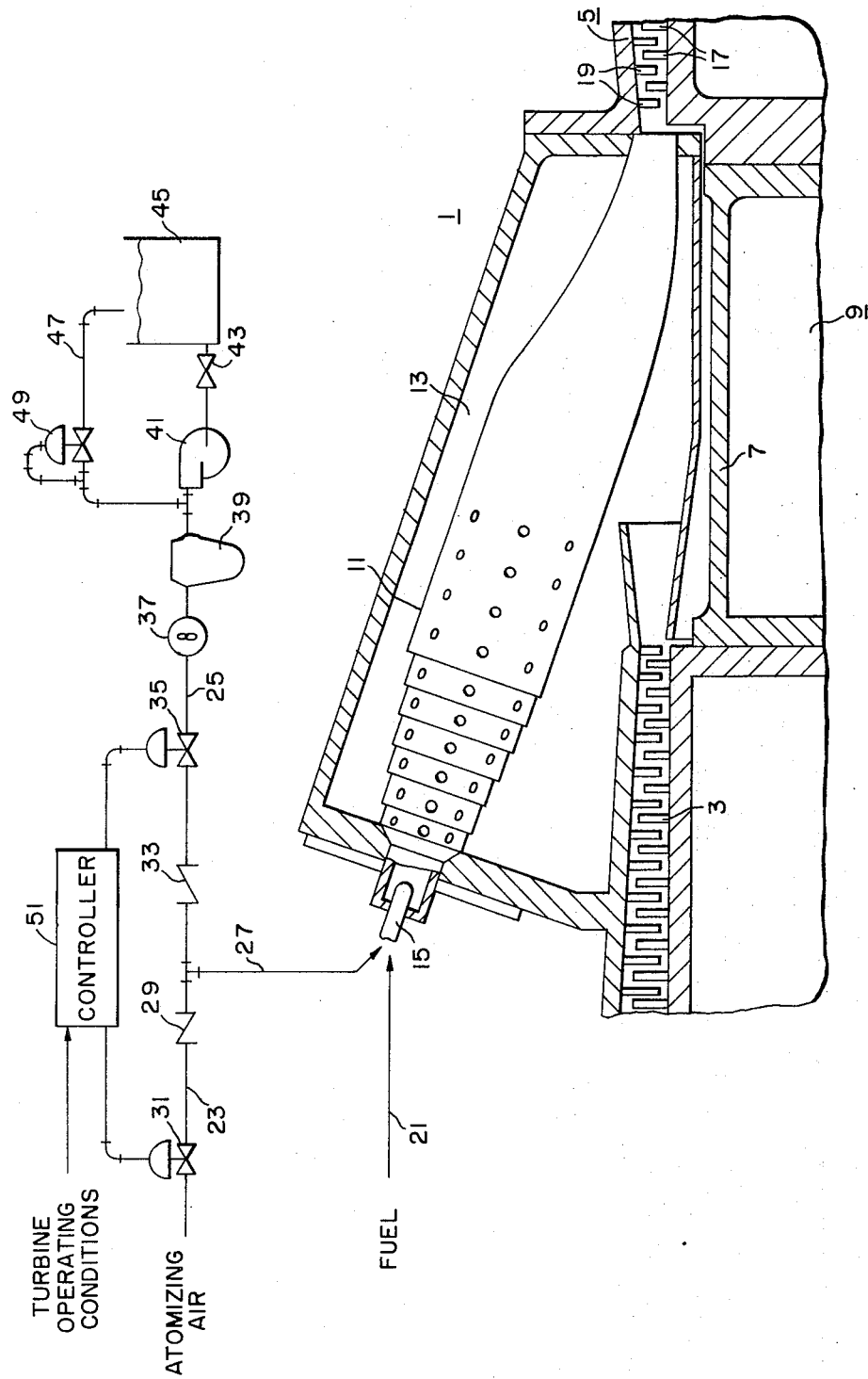
FIG. 1 is a flow diagram showing the flow of fuel, atomizing air and coolant water to the fuel injection nozzle.

Referring now to the drawings in detail, FIG. 1 shows a gas turbine 1 having a compressor portion 3 and a turbine portion 5 connected together by a torque tube 7 which forms a common shaft or rotor 9. A plurality of combustion chambers or combustors 11 (only one is shown) are disposed circumferentially around the compressor portion 3 and torque tube 7. The combustion chambers 11 are disposed 1n an angular plenum chamber 13 into which the compressor portion 3 discharges. A fuel injection nozzle 15 is disposed adjacent the upstream end of the combustion chamber 11, the end on the left as shown in FIG. 1. Liquid fuel or fuel oil is supplied under pressure to the fuel injection nozzle 15. The fuel injection nozzle atomizes the fuel mechanically at high fuel flows and utilizes atomizing air at lower fuel flows to atomize the fuel. The atomized fuel mixes with air from the compressor 3 forming a combustible mixture which is burned to produce a hot motive fluid. Immediately downstream of the combustion chambers 11 are a plurality of annular arrays of stationary and rotatable turbine blades 17 and 19, respectively, which cooperate to change the heat and pressure energy in the motive fluid to rotating mechanical energy.

As shown in FIG. 1, the nozzle 15 is supplied with fuel via a fuel supply conduit 21, with atomizing air via an atomizing air conduit 23 and with a fluid coolant, water, steam or other fluid, via a fluid coolant conduit 25. The conduits 23 and 25 have a common portion 27 adjacent to fuel nozzle 15. The atomizing air conduit 23 has a check valve 29 and a control valve 31 disposed in series therein.

The coolant fluid conduit 25 has a check valve 33, a control valve 35, a flow meter 37, a filter 39, a pump 41, and a shut-off valve 43 disposed therein in series. A water reservoir 4 is disposed on the upstream end of the coolant fluid conduit 25.

A pressure relief conduit 47 is connected to the coolant fluid conduit 25 downstream of the pump 41 and discharges into the reservoir 45. A pressure relief valve 49 is disposed in the pressure relief conduit 47 and opens when the pressure in the coolant fluid conduit 25 exceeds a predetermined value.

A controller 51 responsive to one or more turbine operating conditions such as temperature, pressure or speed of the turbine is disposed to produce a signal to operate the atomizing air control valve 31 and the coolant fluid control valve 35.

Figure 2:
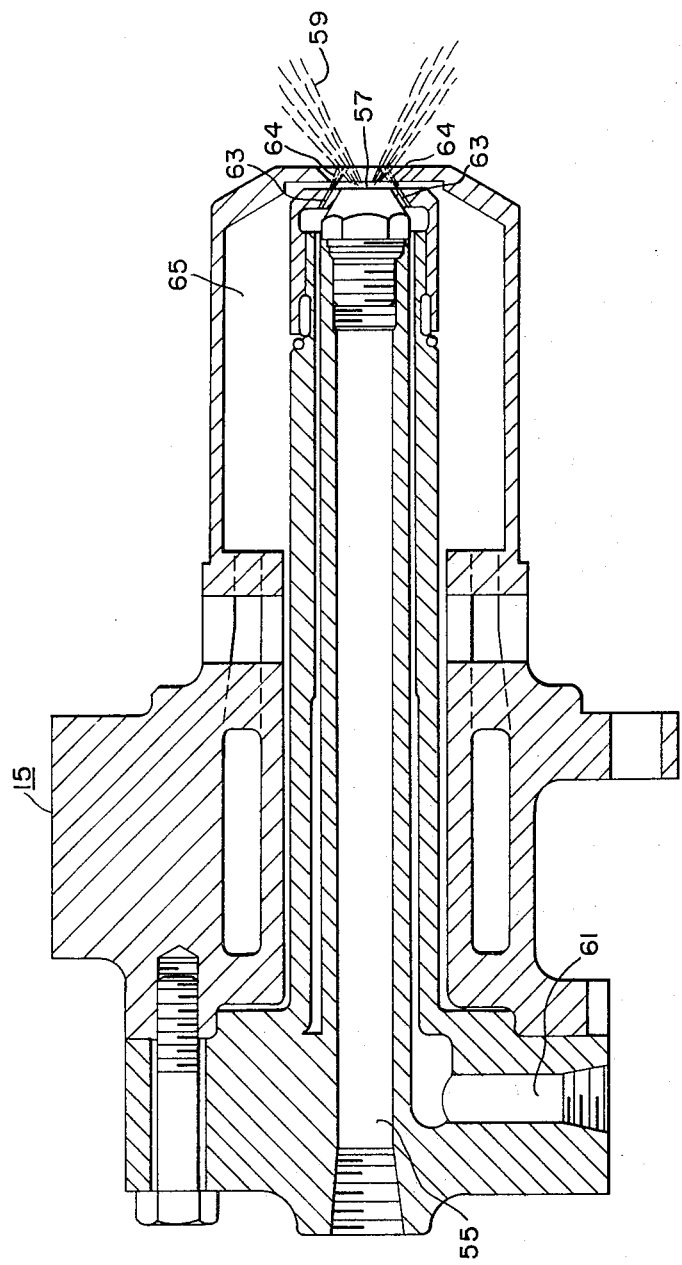
FIG. 2 is a sectional view of a fuel injection nozzle utilized in this invention.

FIG. 2 shows a fuel injection nozzle 15 having a fuel passageway 55 and an orifice 57 so disposed therein and arranged that the influent fuel flowing into the combustion chamber 11 generally forms a diverging hollow conical shaped spray 59.

Also disposed within the fuel injection nozzle 15 is an atomizing air passageway 61 and a plurality of orifices 63 so disposed to generally form a plurality of discrete jets of coolant fluid 64 which are generally skewed to the axis of the nozzle and generally inclined at a compound angle with respect thereto so as to contact the burning fuel spray in a zone wherein the flame is the hottest and thereby provide extremely efficient tempering of the flame and substantial reduction in the $NO_x$ compounds produced while utilizing a minimum quantity of coolant fluid. Means for supplying primary combustion fuel gas 65 are also disposed within the fuel injection nozzle 15.

Atomizing air is only utilized during ignition or during other modes of operation when the fuel flow is low, therefore, the same passageway 61 and orifices 63 through which atomizing air is supplied to the combustion chamber are available for admitting a coolant fluid such as water, steam or other fluid directly to the combustion zones during the normal modes of operation, thus supplying a coolant fluid directly to the combustion area which effectively reduces the quantity of nitrogen-oxygen compound, $NO_x$, produced by burning the fuel in the combustion chamber. Utilizing the atomizing air passageway 61 and orifices 63 provides for economically retrofitting gas turbines already in service with the necessary equipment to reduce the quantity of $NO_x$ in the exhaust gases of the turbine, and has proven to be extremely effective in reducing $NO_x$ compounds so that gas turbines, thus modified, meet all of the presently existing county, state and federal regulations with respect to $NO_x$ emission. Introducing the coolant, as hereinbefore described, advantageously injects the coolant in close proximity to the burning fuel, brings the coolant to the hottest flame zones to produce extremely efficient tempering of the flame and substantial reduction in the production of $NO_x$ compounds while utilizing a minimal quantity of coolant fluid.

What is claimed is:

1. A gas turbine comprising a combustion chamber, a fuel injection nozzle for supplying fuel to the combustion chamber, said fuel injection nozzle having an atomizing air passageway and a plurality of orifices which are utilized during ignition and low fuel flows to atomize the influent fuel entering the combustion chamber, means for shutting off the atomizing air to said passageway and orifices and means for supplying a pressurized coolant fluid to said passageway and orifices whereby the coolant fluid admixes with the burning fuel and thereby reduces the flame termperature and the quantity of nitrogen-oxygen compounds produced in the combustion chamber.

2. A gas turbine as set forth in claim 1, wherein the coolant fluid is water.

3. A gas turbine as set forth in claim 1, wherein the air atomizing orifices are so disposed that the coolant fluid leaving the fuel injection nozzle forms a plurality of discrete jets skewed with respect to the axis of the injection nozzle and inclined at a compound angle with respect thereto.

4. A gas turbine as set forth in claim 1, wherein the fuel injection nozzle has a fuel passageway and orifice so arranged that the fuel leaving the fuel injection nozzle generally forms a diverging hollow conical shape spray with the apex adjacent the end of the injection nozzle.

5. A gas turbine as set forth in claim 4, wherein the fuel injection nozzle has the atomizing air passageway and orifices so arranged that the coolant fluid leaving the nozzle forms a plurality of discrete jets skewed with respect to the axis of the injection nozzle and inclined generally at a compound angle with respect thereto.

6. A gas turbine as set forth in claim 4, wherein this coolant fluid is water.

7. A gas turbine comprising a combustion chamber, a fuel injection nozzle for supplying fuel to the combustion chamber and disposed adjacent one end thereof, said fuel injection nozzle being supplied with a liquid fuel and a coolant fluid and having a fuel passageway and orifice so disposed therein that the fuel leaving the injection nozzle generally forms a diverging conical shaped hollow spray and the fuel injection nozzle having a coolant fluid passageway and a plurality of orifices so arranged that the coolant fluid leaving the injection nozzle forms a plurality of discrete jets skewed with respect to the axis of the injection nozzle and inclined generally at a compound angle with respect thereto, whereby said fluid coolant admixes with said fuel as it burns to reduce the flame temperature and the formation of nitrogen-oxygen compounds formed in the combustion chamber.

8. A gas turbine as set forth in claim 7, wherein the coolant fluid is water.

* * * * *